United States Patent [19]

Moore

[11] 4,237,344
[45] Dec. 2, 1980

[54] RAPID RESPONSE HEALTH CARE COMMUNICATIONS SYSTEM

[75] Inventor: John R. Moore, San Francisco, Calif.

[73] Assignee: Hospital Communication Systems, Inc., Greensboro, N.C.

[21] Appl. No.: 31,924

[22] Filed: Apr. 20, 1979

Related U.S. Application Data

[63] Continuation-in-part of Ser. No. 851,412, Nov. 14, 1977, abandoned.

[51] Int. Cl.$^3$ .......................................... H04M 11/00
[52] U.S. Cl. ................................. 179/2 A; 179/1 H; 340/286 R
[58] Field of Search .................. 179/1 H, 1 HF, 2 R, 179/2 A, 2 TS, 2 TV; 340/286 R, 312, 313; 358/85, 86

[56] References Cited

U.S. PATENT DOCUMENTS

| | | | |
|---|---|---|---|
| 2,496,629 | 2/1950 | Lamberty et al. | 340/312 |
| 3,261,011 | 7/1966 | Crosthwait | 340/286 R |
| 3,304,376 | 2/1967 | Truby | 179/1 H |
| 3,439,320 | 4/1969 | Ward | 340/312 |
| 3,492,426 | 1/1970 | Foreman et al. | 179/2 A |

Primary Examiner—Raymond F. Cardillo, Jr.
Assistant Examiner—Joseph A. Popek
Attorney, Agent, or Firm—Lane, Aitken, Ziems, Kice & Kananen

[57] ABSTRACT

A rapid response health care communications system for providing rapid and reliable health services to patients located within or outside a health care facility, such as an acute-care hospital, includes personnel locator for identifying both the type and the location of health care personnel, such as doctors, nurses, interns, and the like; and personnel communicating network for communicating with certain of such personnel from a central location to direct them to patient locations where their need is paramount. A patient response communication network is provided for communicating with the patient or with the patient's room from the central location to identify the patient's needs and the personnel required to respond to those needs. A central console at the central location includes a plurality of locator panels, one for each floor of the facility, each of which include indicator lamps for identifying the particular location of the health care personnel within the facility. The console further includes a device for storing and retrieving a patient's medical profile to assist the health care coordinator in making an informed judgment as to the type of care required for a particular patient and the type of health care personnel needed to provide the required care. In addition, an out-of-hospital communication network using auto-dialing telephones is provided to allow outpatients to communicate from outside the facility with the health care coordinator to assist the outpatients in rapidly and efficiently receiving appropriate advice and health care as indicated by the patient medical profile and for responding to emergency situations.

14 Claims, 13 Drawing Figures

TO FIG. 2.

RAPID RESPONSE HEALTH CARE COMMUNICATIONS SYSTEM

This application is a continuation-in-part (CIP) of copending U.S. Patent application Ser. No. 851,412, filed on November 14, 1977, now abandoned, by the present inventor.

BACKGROUND OF THE INVENTION

This invention relates to a rapid response health care communication system. More particularly, this invention relates to a rapid and reliable communication system for promptly and reliably providing health care within or outside of a health care facility, especially adapted for operation by a trained health care coordinator. Still more particularly, the subject matter of this invention relates to a communication network for indicating the identity and the location of particular types of health care personnel at various sites in the facility and means for communicating with such personnel at a location to direct their presence to another location in coordination with a patient communication system within the facility. Still more particularly, the invention relates to a system of the type described further including an outpatient communication system, preferably including automatic dialing telephones for providing monitoring and coordinating of emergency health care to patients at home after discharge from the facility.

In general, it has long been a problem in the art to establish communication systems for locating personnel in a large facility, the most common of which is probably a conventional paging system. In a health care facility, however, the communication problem is particularly acute for many reasons. Because of the need for rapid response to a patient's needs in a health care facility and the inherent mobility to health care personnel throughout the facility, a number of communication systems and networks have been established for indicating manually, electrically, or computationally the location of various personnel in the health care facility. By way of a typical example, a patient in need of service often is called upon to depress a call button which provides a signal of a central location, such as a nursing station. When a nurse responds to that signal, she may be called upon to make an informed judgment on the type of response required to accommodate the patient's needs. Where health care judgments are required, the situation may require the nurse to locate an intern or a doctor, all of which result in potentially intolerable delays in providing a response to the needs of the patient.

It is thus an aim of this invention to provide a communication system which can coordinate, at a central location, both the needs of the patient for health care services and the location and identification of health care personnel within the facility who might be available to provide a response to the patient's need.

In the prior art, various hard-wired and remote contact communication systems have been provided for identifying the location of personnel and communicating with such personnel from a central source. However, in the main, such systems which have been established for identifying the location of health care personnel have not been utilized in combination with a system for communicating with the personnel at the identified location and directing their presence in a coordinated fashion to a patient in need of health care services from a central facility.

Moreover, it is a continuing problem to make available health care from a facility to patients who have been discharged from the facility but who are in continuing need of monitoring or supervision during their continuing convalescence. Still further, it is desirable to provide a convenient mode for communicating with the facility to encourage the outpatient to reach the facility when desirable. Thus, it is an additional problem in providing a rapid response health care system to provide a mechanism which is capable of rapid and efficient communication with the facility by a patient outside of the facility in order that an informed judgment on the degree of health care which might be necessary to respond adequately to the patient's needs is available.

Accordingly, it is a general object of this invention to provide a rapid response health care system which provides, in combination, a solution to all of the foregoing problems.

It is an additional object of this invention to provide a health care communication system which features a communication network capable of identifying the location of health care personnel and directing their presence from a central location to a location of greater need.

It is an additional object of this invention to provide a communication network which is capable of rapidly receiving a request for health care from a patient on the basis of voice, telephone, visual, or emergency signaling and to direct, in a coordinated manner, the appropriate health care personnel from an identified location to the location of the patient.

It is an additional object of this invention to provide a rapid response health care system which provides means for utilizing the services of a trained health care coordinator at a central location for receiving information from either within the facility or outside of the facility from a patient and directing a medical response that is appropriate under the circumstances.

It is a further overall object of this invention to provide means for the health care coordinator at the central location which include a console having means for promptly retrieving the patient's medical profile from an information storage device in order to assess the medical response required.

It is an additional feature of this invention to provide a system of the type described in which parallel communication functions are provided from a patient's room to a nursing station on an individual floor in the facility, as well as to the central location.

It is another object of this invention to provide a central console particularly adapted for use by a trained health care coordinator which console includes hospital personnel locator panels, for each floor of the facility, a personnel locator switch board, a patient communication panel, means for storing and retrieving a patient's medical profile, and means for receiving communications from outpatients.

These and other objects will become apparent from a detailed review of the written description of the invention taken in conjunction with the accompanying drawings.

SUMMARY OF THE INVENTION

Directed to achieving the aforestated objects of the invention and overcoming the problems and deficiencies in communication systems for health care facilities in the art, this invention relates to a rapid response health care system having centrally located means for coordinating through trained personnel a request for health care services and rapidly directing such personnel to the desired location.

The system according to the invention includes personnel locating means for identifying the location within the facility of the various types of hospital personnel, such as doctors, interns, registered nurses, licensed practical nurses, licensed vocational nurses, orderlies, and the like. The personnel locating means include means for identifying both the type of personnel and their particular location within the facility by the use of an interconnection between the various rooms for patients and the other locations within the health care facility with a central monitoring panel staffed by a trained health care coordinator. The individuals to be located on each floor depress a button located at a panel near the door of the room of a patient when they enter the room, which action in turn will provide a corresponding visual signal on a graphic display panel on an operational board at the central console location of the health care coordinator. When the individual leaves the prenoted location, the individual activates the switch to turn off the light at that location as well as at the central console and repeats the process at a new location. The switches are identified for the various personnel at each locator panel. By this technique, the health care coordinator is able to monitor the location of all health care personnel on an individual floor basis or subsection basis within the facility. While direct electrical connections from switches and lights on the locator panel at the particular room are presently preferred, the locating function may also be achieved by radio frequency transmission from the panel to the console or by coded electrical signals on single or multiple conductors interconnecting the room and the console.

In each patient's room, means are provided to permit the patient to communicate with the health care coordinator at the central console. In its preferred embodiment, the patient response means include two-way speakers located in each room for permitting voice communication with the health care coordinator at the central console, a conventional call button, telephone communicator and/or telephone communication with a speaker phone facility. In this way, the patient is able to promptly communicate with the halth care coordinator at the console.

Upon receipt of the patient's signal in a particular mode, the health care coordinator is provided with means for visually displaying the patient's medical profile from a storage device at the central console. Various types of storage and retrieval techniques may be utilized for this feature, the most common being a computer storage and retrieval device wherein the health care coordinator can access a computer with a predetermined patient identity code to visually display the patient's profile on a screen.

The health care coordinator, upon receipt of the patient's signal, having reviewed the patient's medical profile, and by knowing the location of health care personnel on a given floor, or in proximity with the calling patient, can accurately and precisely make an informed decision on the degree of medical response required and the appropriate responding personnel and communicate that decision to the desired personnel.

If desired, parallel communication functions may be established at other locations on the floor outside of the patient's room at which location hospital personnel may be situated. For example, the locator means and floor layout data and parallel patient communication functions may be provided at a nursing station on the floor.

A residence communication network is also provided in communication with the control console to permit prompt communication from an outpatient with the health care coordinator at the central console. In its most typical embodiment, an automatic dialing telephone at the outpatient's residence is connected into the standard telephone system which, when activated, automatically dials the health care coordinator and provides an audio signal to identify the caller to the health care coordinator. By the information retrieval system previously mentioned, the coordinator instantly has available through a computer, microfilm system, or comparable arrangement, the medical profile of that outpatient and all information necessary to reach the necessary emergency services, such as a paramedic ambulance service, police, fire department, and the like. Various types of telephone automatic dialing systems may be utilized, as can speaker telephone systems. Moreover, the system may include in addition to audio transmission of the patient identification, a coded identification number which could be audio or electronic. In addition, automatic answering services may be provided to coordinate the question raised by the outpatient with the appropriate personnel. In addition, a non-health care function from the resident's telephone could also be provided for such matters as smoke detection, intrusion, water flow, monitoring a heating and cooling system, freezer temperatures, and the like, in those residences of outpatients whose ambulatory or sensing functions are restricted or impaired. In this manner, the health care provided can be extended somewhat to environmental care for the outpatient.

DESCRIPTION OF THE PREFERRED EMBODIMENTS

Figure 1:
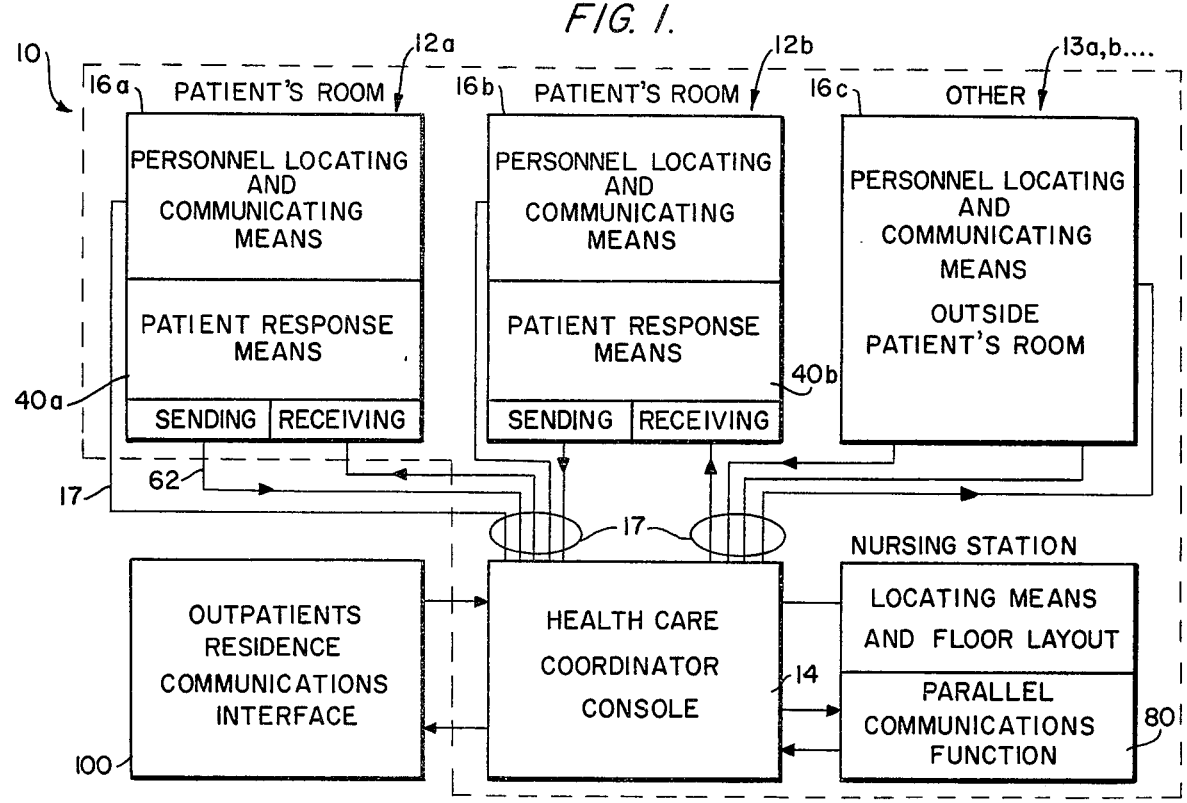
FIG. 1 is a block diagram of the system according to the invention illustrating a plurality of patient's rooms each including personnel locating and communication means and patient response means for communication with the centrally-located health care coordinator console which in turn is also in communication with an out-of-hospital communication network, and further illustrating parallel locating means and communication means at a nursing station.

A rapid response health care communication system in accordance with the present invention is schematically represented in FIG. 1 and includes a health care console 14 which is preferable located in a health care facility 10 (broken-line illustration), e.g., a hospital, and staffed by a specially trained health care coordinator. The health care console 14 is connected through various communication paths, described in more detail below, to both in-hospital patient and non-patient locations and out-of-hospital patient locations.

The in-hospital locations include some and preferably all the patient rooms 12a, b, ... in the hospital and other selected non-patient locations 13a, b, ... within the hospital that are normally occupied by the medical staff. These other locations can include, for example, examination rooms, staff lounges, laboratories, conference rooms, and the like. Each patient room 12a, b, ... is equipped with a patient response means 40a, b, ... connected to the health care console 14 through a cable 17 by which the patient can signal or otherwise alert the health care coordinator and engage in two-way communication with the coordinator by means of a two-way communication interface such as a telephone handset and/or a speakerphone. Additionally, each patient room 12a, b, ... and each of the non-patient locations 13a, b, ... includes a personnel designation and communication means 16a, b, c, ... connected to the health care console through the cable 17 by which the medical staff at each patient and non-patient location can actuate a switch to provide an indication at the health care console 14 of the type of medical personnel, e.g., DR, RN, LPN, TECH, etc. at each location and through which either the coordinator or the medical staff member can initiate two-way communication.

The out-of-hospital locations generally include outpatient residences and other locations including nonacute care nursing homes and retirement homes. Each out-of hospital location is equipped with a telephone-type communications interface 100 which includes, as described below, a conventional telephone, a button actuated auto-dialer for electrically offhooking the telephone and dialing the health care coordinator, an auto-identifier to automatically identify the patient to the coordinator by patient name and/or identification number and to automatically identify the patient to a computer by digitally encoded signals, a speaker phone for hands-off two-way communication, and a time out/hang-up feature by which the coordinator can dial the out-of-hospital location, electrically off-hook the telephone at the selected location, and communicate with the patient through the speakerphone with the patient telephone automatically on-hooking (that is, electrically hanging-up) after a predetermined time period.

While the primary communication functions between the in-hospital patient and non-patient locations and the out-of-hospital patient locations are centered at the health care console 14, redundant communication functions can be provided at other locations including one or more nursing stations 80 in the hospital.

Figure 2:
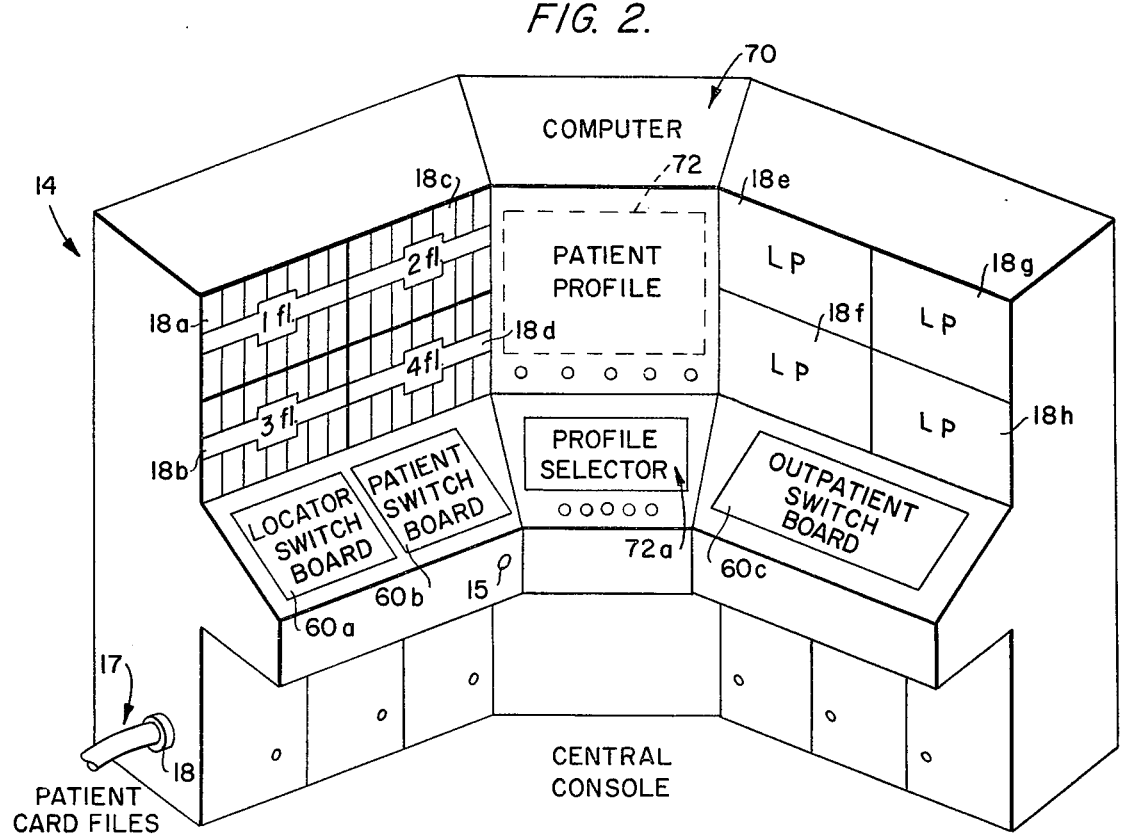
FIG. 2 is a frontal perspective view of the central console for the health care coordinator showing the locator panels with an accompanying floor layout, the patient profile selector and display means, and the outpatient switching facilities.

The health care console 14, as shown in FIG. 2, includes a plurality of location display panels 18a, b, c, ..., a patient medical profile viewing screen 72, a location switch board 60a, a patient switch board 60b, a profile selector key board 72a, and an out-patient switch board 60c. The location display panels 18a, b, ... each graphically display the room/floor plan of a particular portion of the hospital 10 and provide a continuous indication to the health care coordinator of the location and type of medical personnel in the hospital. In FIG. 2, the location display panels 18a, b, ... display the room/floor plan for an eight floor hospital with only the room/floor plans for the first, second, third, and fourth floors actually illustrated. The various display panels 18a, b, ... include all the in-hospital locations including the patient rooms and the non-patient locations.

The patient profile display 72 provides medical profile information to the health care coordinator in response to a patient call-up code entered through the profile selectors 72a. In the preferred embodimemt, the profile display 72 and the profile selector 72a are CRT/keyboard terminal connected to an information storing computer containing the medical profile information of all the patients that are part of the system. Suitable computers for use in the system include the Apple II (Apple Computer, 10260 Bandley Drive, Cupertino Ca. 95014), the Challenger IP (Ohio Scientific, 1333 S. Chillocothe Rd., Aurora, Ohio 44202) and the TRS--80 (Radio Shack, Ft. Worth, Texas 76101). The patient medical profile information is retained in the computer memory and organized such that the appropriate file will be displayed on the visual display 72 when the proper entry code (e.g., the patient's last name, an hospital I.D. number, or the like) is entered into the profile selector 72a. Also the computer can be programmed to automatically display the medical profile of an out-of-hospital patient in response to the aforementioned digitally encoded signals provided by the auto identifier portion of the out-of-hospital communication interface 100. While a computer call-up arrangement is preferable, other patient profile retrieving means including various types of microfilm and microform information retrieval systems are suitable.

The various switch boards 60a, 60b, and 60c permit the health care coordinator to establish two-way communication between the coordinator using a telephone hand set 11 (see FIG. 2B) connected to the console 14 through a plug-type telephone jack 15 and each of the various in-hospital and out-of-hospital locations. Although the various switch boards have been functionally divided into three separate switch boards in FIG. 2, all the switch board type functions are preferably combined or integrated into a single key-operated PBX console.

Figure 2A:
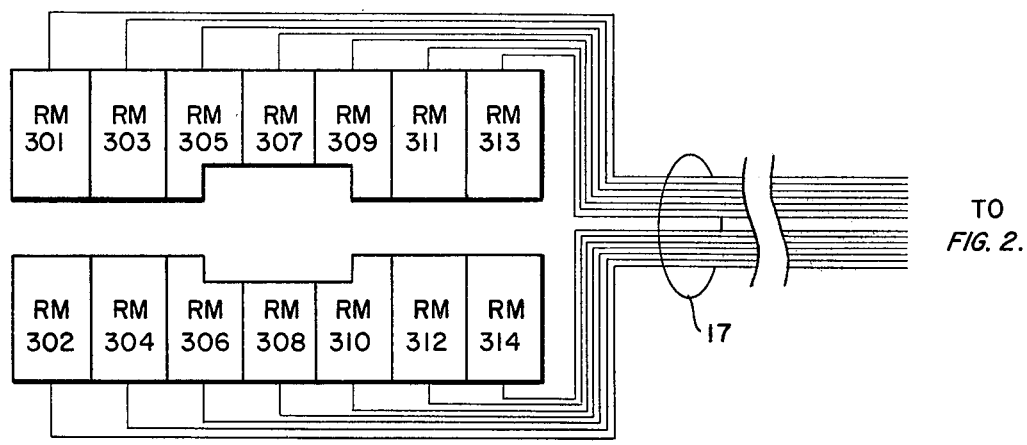
FIG. 2A is a representative schematic diagram of a hospital floor plan.

A typical room/floor plan for a representative floor, that is, the third floor hospital 10 is shown in FIG. 2A and corresponds to the room/floor plan graphically displayed of location display panel 18b in FIG. 2. As shown in FIGS. 2 and 2a, the rooms 301 through 314 are connected by individual lines through the communication cable 17 to the health care console 14 through a connector 18 at the console 14. While individual hard-wired circuits have been illustrated as connecting each of the patient rooms 12a, b, . . . with the health care console 14, other communication arrangements may be selected, for example, a single communication buss extending to each in-hospital patient and non-patient locations with communication effected by digitally encoded, multiplexed signals.

Figure 7:
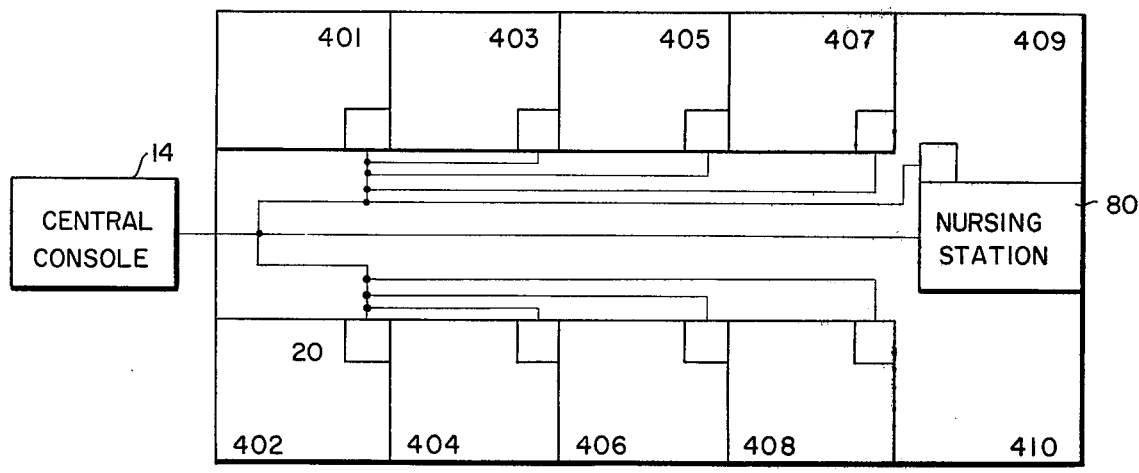
FIG. 7 is a simplified floor plan of a typical floor arrangement in a health care facility showing the locator panels and visual display means outside each room in communication with the control console.

As shown in FIG. 7, parallel or redundant communications can be provided at a nursing station 80 remotely located from the health care console 80.

Figure 2B:
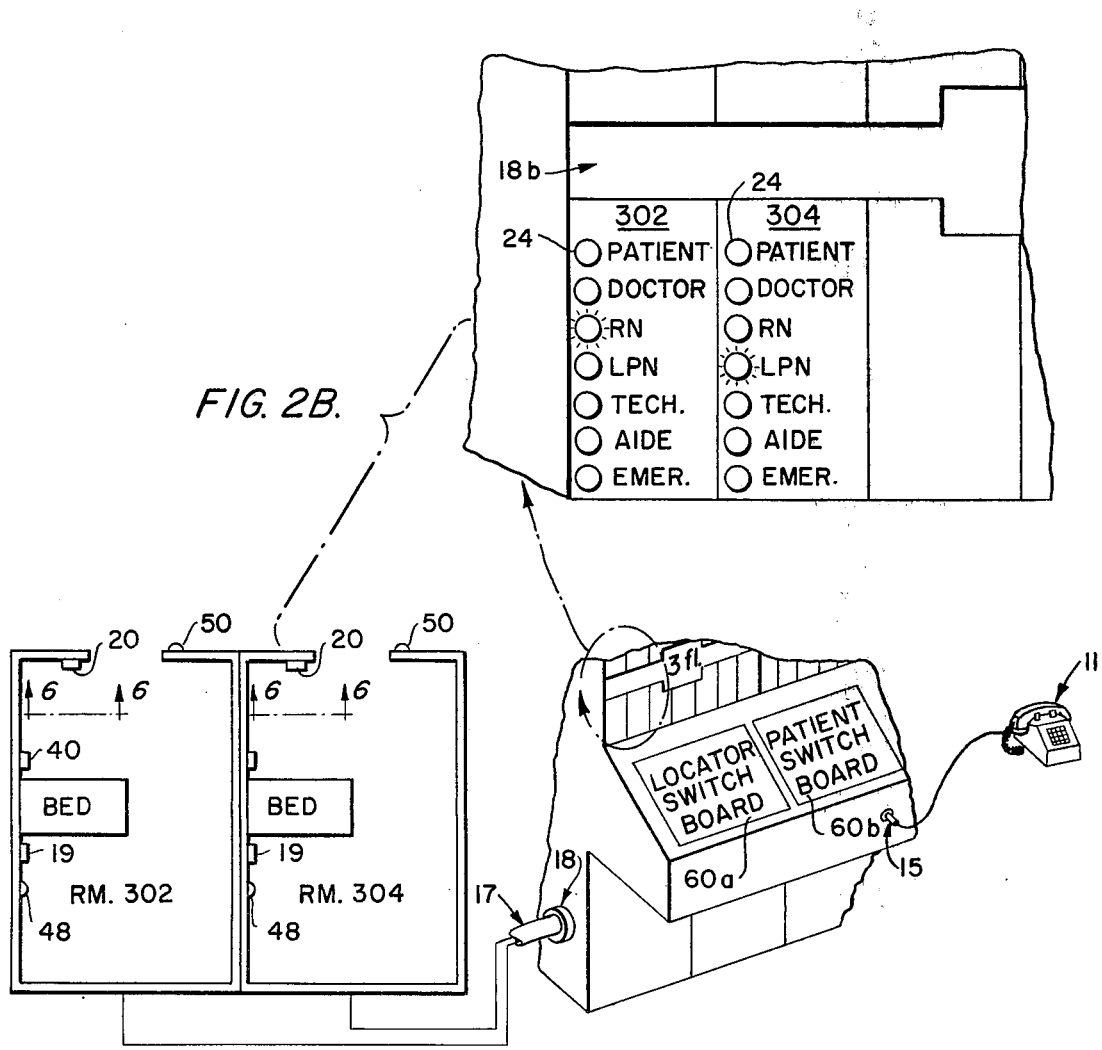
FIG. 2B is a diagramatic illustration of the relationship between two representative patient rooms and the location display panels of the health care console of FIG. 2.
Figure 6:
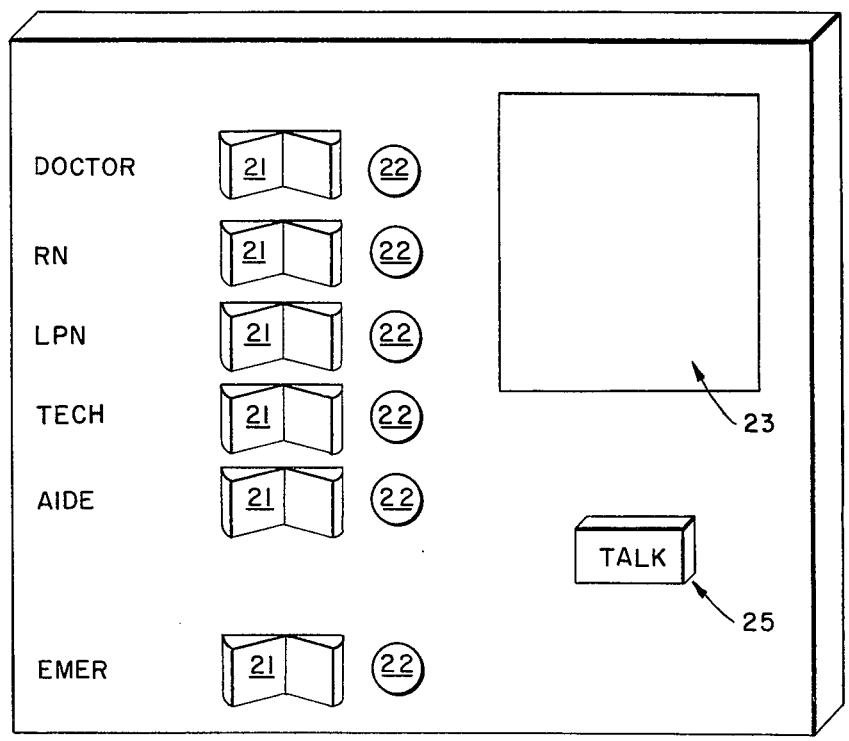
FIG. 6 is a frontal view of a personnel location designator.

The communication relationships between the various patient rooms 12a, b, . . . and the health care console 14 is shown in somewhat greater detail in FIG. 2b in which rooms 302 and 304 are shown connected through the communication cable 17 to the console 14. Each patient room 12a, b, . . . as well as the various non-patient locations 13a, b, . . . in the hospital include a personnel location designator 20 that is preferably located near the entrance of each selected location. One form of the personnel location designator 20 is shown in FIG. 6 and another form of the designator, 20a, is shown in the patient room layout of FIG. 3. Each personnel location designator 20 includes a plurality of switches 21 and associated indicator lamps 22 that are connected through the communication cable 17 to the corresponding lamps 24 on the location display panel 18b (FIG. 2b). Each switch is identified by a particular designation such as DR, RN, LPN, TECH., AIDE, and Emergency. When a particular hospital room 12a, b, . . . or 13a, b, . . . is occupied by a particular type of medical personnel, the appropriate switch 21 on the location designator 20 is actuated causing the adjacent lamp 22 to illuminate and the corresponding indicator lamp 24 on the appropriate portion of the indicator panel 18 to also illuminate. For example, when a selected switch is actuated, e.g., the doctor and nurse switches in room 302 and the doctor and LPN switches in room 304, the corresponding lamps 24 on the locator designator panel 18b for those rooms are illuminated to provide a continuous indication to the health care coordinator of the personnel present in those rooms. As is readily apparent, the health care coordinator has a continuous, real-time indication of the location of the various types of medical personnel at the various patient and nonpatient locations in the hospital 10.

Figure 2C:
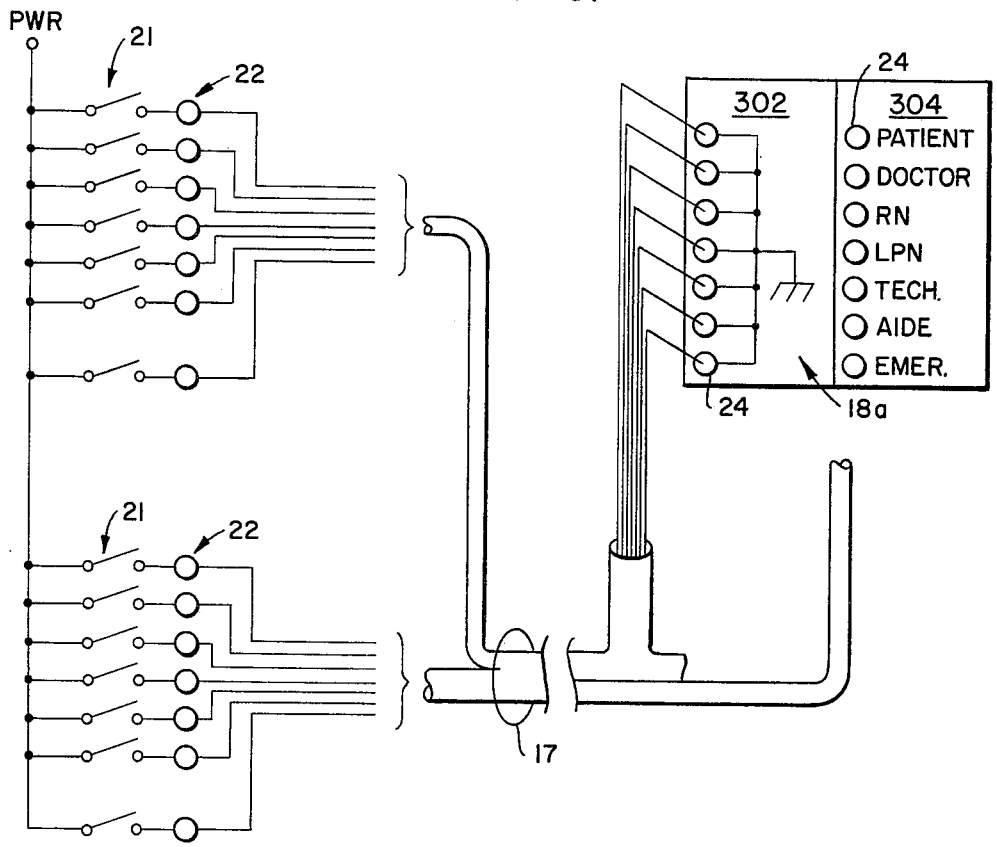
FIG. 2C illustrates a series-wired electrical connection circuit between each patient room and a location display panel.
Figure 2D:
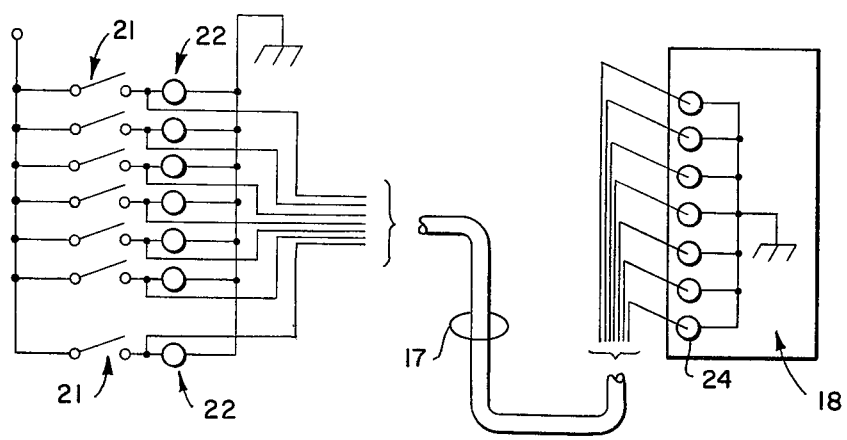
FIG. 2D illustrates a parallel-wired electrical connection circuit between each patient room and a location display panel.

Exemplary circuit diagrams for connecting the personnel location designators 20 with the appropriate location display panels 18a, b, . . . are shown in FIGS. 2c and 2d. In FIG. 2c, the various switches 21 are serially connected through their adjacent lamps 22 to the appropriate indicator lamps 24 on the location display panel 18, and, in FIG. 2d, the lamps 22 and 24 are parallel-wired to their associated switches 21.

Each location designator 20 also includes a communication interface such as a push-to-talk intercom which includes a speaker 23 and a button 25, by which the medical personnel in a selected room can open two-way communication with the coordinator or, conversely, the health care coordinator can, through the locator switch board 60a, open two-way communication with the personnel in a selected patient or nonpatient location. The personnel location panels 20 and the associated intercom 23/25 constitute the personnel locating and communicating means 16a, b . . . discussed above in connection with FIG. 1. In addition to providing the intercom on the personnel location designator panel 20, a telephone handset 19 is provided adjacent the patient's bed (FIGS. 2b and 3) to permit two-way communication between the coordinator and the medical personnel who are administering to a patient's needs.

Figure 3:
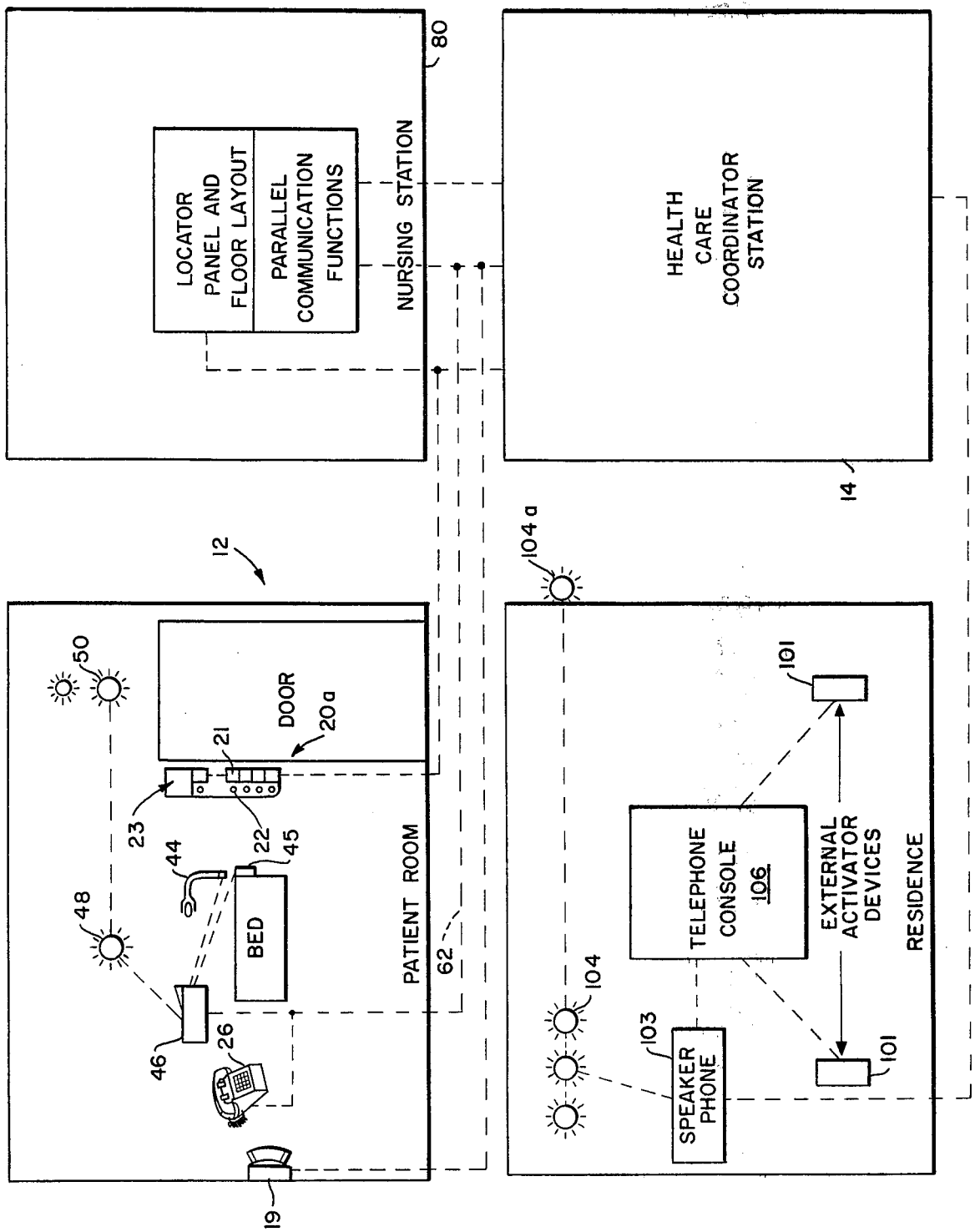
FIG. 3 is a simplified block diagram with additional communication details of the system shown in FIG. 1.

Each patient room 12a, b, . . . is equipped with a patient/health care coordinator communication interface that permits the patient or the health care coordinator to open two-way communication with each other. As shown in FIG. 3, each patient room includes a conventional telephone 26, a speakerphone 46, and a manually operated call-button 44. The patient can alert the health care coordinator to his or her needs by operating the callbutton 44 to cause the appropriate patient lamp 24 on the console location display panel 18 to illuminate and thereafter wait for the coordinator to open communications through the patient switch board 60b to either the patient telephone 26 or the patient speakerphone 46. In the alternative, the patient can open up communications with the coordinator through his or her telephone 26 or speakerphone 46.

Figure 8:
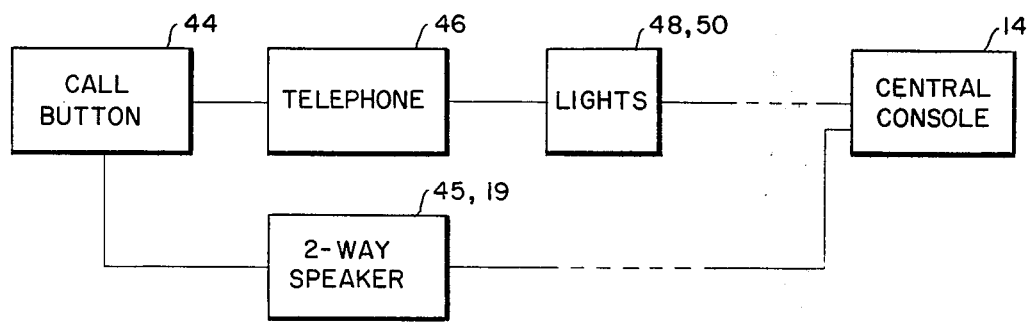
FIG. 8 is a simplified block diagram of a portion of the patient response communication system in circuit with a central console.

Each patient room is equipped with a visual indicator 48 above the patient bed and another visual indicator 50 located above the patient's door. These indicators are automatically activated whenever the patient initiates communication with the coordinator and serve to visually notify the medical staff outside the patient's room that a particular patient requires assistance. As shown in the block diagram of FIG. 8, the operation of the manual callbutton 44 actuates the patient telephone 26, the speakerphone 46, and the visual indicators 48 and 50.

Figure 5:
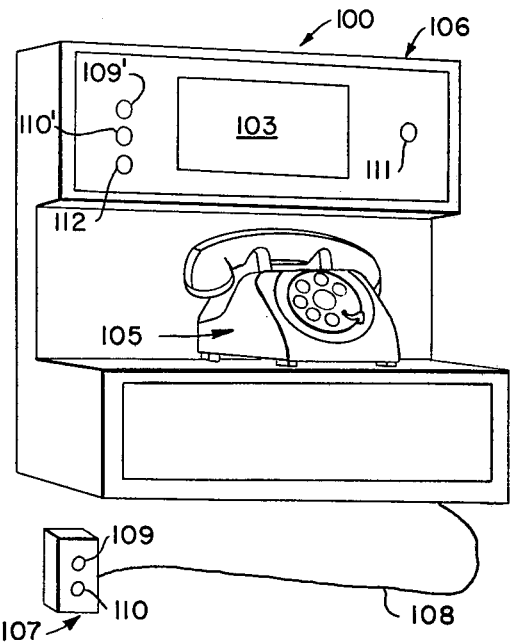
FIG. 5 is a perspective view of an out-of-hospital communication interface that employs the automatic time-out/hang-up device of FIG. 4.

Each out-of-hospital location includes a communication interface 100 of the type shown in FIG. 5. Each interface 100 includes a conventional telephone 105 mounted on a console 106 that includes a hand-held remote control unit 107 connected to the console 106 by a cable 108. The remote control unit 107 and the console 106 include, respectively, "nurse call" buttons 109 and 109' and "hung-up" buttons 110 and 110'. In addition, the console 106 includes a privacy button 111 (explained below), a night-light button 112, and a speakerphone 103.

Figure 9:
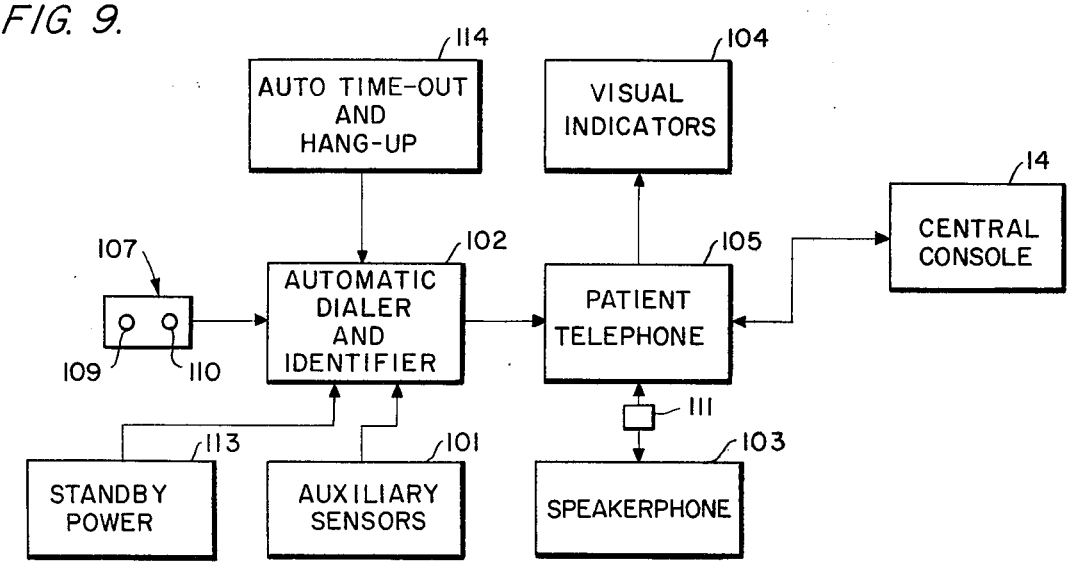
FIG. 9 is a simplified block diagram of the out-of-hospital communication system in circuit with the central console.

As shown in the schematic block-diagram of FIG. 9, each communication interface 100 includes an automatic dialer/automatic identifier 102 connected to both the hand held remote control unit 107 and the patient telephone 105, the speakerphone 103 which may be selectively connected with the telephone by the patient using the manually operable privacy switch 111, a stand-by power supply 113, an automatic time out and hang-up unit 114, a plurality of auxiliary sensors 101, and visual indicators 104 and 104a.

The automatic dialer/automatic identifier 102, when actuated by the depression of the nurse call-button 109 or 109' electrically off-hooks the telephone 105, dials the health care coordinator console 14, and automatically identifies the patient to the health care coordinator by name and identification number and automatically identifies the patient to the health care computer by a computer recognizable code. In the preferred form, the automatic identification is accomplished by a endless loop magnetic tape carrying the required information.

When the call has been placed, the patient may then speak with the health care coordinator through the speakerphone 103 or disconnect the speakerphone by opening the privacy switch 111 and communicate with the health care coordinator privately through the telephone hand-set.

The automatic dialer/automatic identifier 102, in addition to being actuatable by the nurse call-buttons 109 and 109', can also be actuated by one or more remotely located sensors, e.g., smoke detectors, intrusion alarms, unintended water flow detectors, and sensors for monitoring the heating and cooling system operations and appliance functioning.

After the telephone call has been completed and the patient has indicated his or her needs to the health care coordinator, the appropriate assistance may then be dispatched by the coordinator. The patient then electrically on-hooks the telephone, that is, electrically hangs-up, by depressing the hang-up button 110 or 110'.

Each of the out-of-hospital locations also include visual indicators 104 and 104a connected to the patient telephone. These indicators illuminate whenever the telephone is in operation with the indicator 104 placed above the out-patient's bed and the indicator 104a placed outside the out-patient residence.

Figure 4:
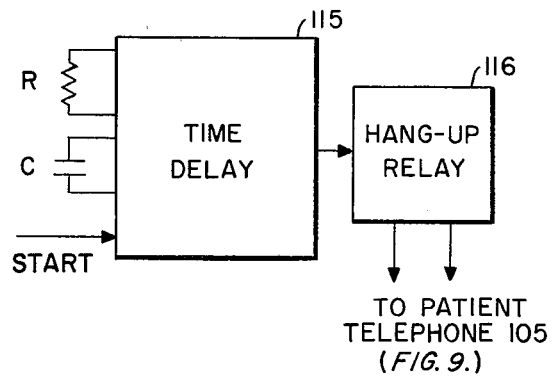
FIG. 4 is a schematic-block diagram of an automatic time-out/hang-up device.

The automatic time delay/hang-up device 114 is connected to the telephone circuits at the telephone 105 and adapted to electrically on-hook (that is, hang-up), the telephone a predetermined period of time after the telephone call is placed by the health care coordinator. As shown in more detail in FIG. 4, the time delay/hang-up device 114 includes an electronic time delay module 115 connected to a relay 116 with the time delay determined by the resistor R and a capacitor C. The time delay is selected to provide a preferred time period, e.g., 90 seconds, after the start of the telephone call to hang-up the telephone. The module 115 is started or triggered by the electric off-hooking signal at the telephone and actuates the relay 116 to on-hook the telephone after the expiration of the time delay period.

A FCC approved auto dialer and identifier suitable for use with the present invention is Dytron Model D-6 or D-12 unit available from Associated Alarm Distributors, Mt. Laural, N.J., a suitable speakerphone is the Duofone Model 42-275A available from the Radio Shack Division of the Tandy Corporation, and a suitable time delay module is the LM55CN time delay unit also available from the Radio Shack Corporation.

In accordance with the invention the medical staff in the hospital, as they enter and leave each patient and nonpatient location having a personnel location designator 20, closes the appropriate switch 21 when they enter each location to cause the corresponding lamp 24 on the appropriate location display panel 18 to illuminate and opens the closed switch 21 when they leave the location to extinguish the corresponding lamp 24 on the location display panels 18. As the medical staff moves about the hospital, the health care coordinator is provided with a continuously up-dated, real time indication of the location of the various type of medical personnel in the hospital.

When an in-hospital patient requires medical attention, he merely depresses his call button 44 to cause an appropriate lamp 24 (FIG. 2B) on the location display panel to illuminate and signal the health care coordinator or communicates with the health care coordinator through the telephone 26 or his speakerphone 46. The callng patient identifies himself afterwhich the health care coordinator calls-up the patient's medical profile by entering the patient name or identification number into the computer through the keyboard 72a. After the patient indicates his or her particular medical need, the health care coordinator determines which type(s) of medical personnel is required to respond to patient's medical need and reviews the location display panels to determine the location of the nearest medical staff member or members of the type that can respond to the patient's medical need. The health care coordinator then opens communication through the location switchboard 60a with the selected location and communicates a patient's location and name, their particular medical need, and, if appropriate, selected facts concerning the patient's medical profile through the intercom 23 or the telephone handset 19 at the selected location. The so-selected medical staff member or members then proceed to the patient location to render the required assistance and, if necessary, effect further communication with the health care coordinator through the telephone handset 19 or the intercom 23 in the patient's room.

In the case where an out-of-hospital patient requires medical assistance, he pushes the "nurse-call" button 109 on the hand-held remote control 107 or the "nurse-call" button 109' on the console 106. The telephone 105 is electrically off-hooked by the automatic dialer-/automatic identifier 102 which then dials the health care console with the audio portion of the recorded message identifying the patient to the health care coordinator and the encoded signal portion identifying the patient to the computer. The out-of-hospital patient then communicates their particular medical need to the health care coordinator who can then dispatch the required assistance, e.g., an ambulance, the police, paramedic team, etc. The out-of-hospital patient can then hang-up the telephone 105 by depressing the "hang-up" button 110 on the hand-held remote control 107 or the "hand-up" button 110' on the console 106. In the event that the patient is to weak to speak into the speakerphone 103 or the telephone 105, the health care coordinator can call the patient's communication interface 100 through the patient switchboard 60b and permit the automatic dialer/identifier 102 to electrically off-hook the patient's telephone 105 and attempt to communicate with the patient through the speakerphone 103. If the patient still does not respond, the health care coordinator can send an emergency medical team. The automatic time-out and hang-up device 114 will automatically on-hook the telephone (that is, electrically hang-up the telephone) after the expiration of the predetermined time period. This allows the health care coordinator to attempt a second telephone communication after the expiration of the time period.

As can be fully appreciated from the above, the rapid response health care communication system of the present invention permits the medical needs of a large number of in-hospital and out-of-hospital patients to be rapidly and efficiently responded to.

As will be apparent to those skilled in the art, various changes and modifications may be made to the health care coordinator system of the present invention without departing from the spirit and scope of the present invention as recited in the appended claims and their legal equivalent.

What is claimed is:

1. A rapid-response health care communication system for a health care facility having a plurality of rooms for patient care comprising:
   a central health-care console adapted for use by a health care coordinator, said console having a plurality of personnel location display means for displaying the location of various types of health care personnel in the facility;

a personnel location designating means at a plurality of preselected locations in the health care facility including said patient rooms connected to said personnel location display means, each of said designation means including a plurality of designator switches, each of said designator switches corresponding to one of a plurality of types of health care personnel, said designator switches selectively operable by the health care personnel at each location to cause a corresponding one of said personnel location display means to provide an indication to the health care coordinator of the type of health care personnel at each of said location designation means;

coordinator/personnel intercommunications-means extending between said central console and each location; said coordinator personnel intercommunication means having a coordinator communication-interface at said central console and a personnel communication-interface at said locations whereby the coordinator and personnel at a selected location may communicate with one another; and coordinator/patient intercommunication-means extending between said central console and each patient room, aid coordinator/patient intercommunication-means having a coordinator communication-interface at said central console and a patient communication-interface at each of said patient rooms whereby the hospital health care coordinator at the central console and the patient at the patient room may communicate with one another;

whereby the health care coordinator, in response to a request by a patient through the coordinator/patient intercommunication-means, may determine the location of selected types of health care personnel from said display means, communicate with selected ones of the health care personnel through the coordinator/personnel intercommunication-means, and direct the selected health care personnel to the patient room location.

2. The health care communication system claimed in claim 1 further comprising:

an illuminable lamp at the personnel location designation means locations associated with each one of said designator switches to provide, when illuminated, a visual indication of the position of said switch.

3. The health care communication system claimed in claim 1 wherein the display means comprises:

a panel having a visual indicator associated with each of said designator switches to provide a visual indication to the health care coordinator of the position of each of said switches at each location and thereby provide an indication to the health care coordinator of the health care personnel type at each location.

4. The health care communication system claimed in claim 3 wherein said visual indicators comprises:

an illuminable indicator associated with each one of said designator switches which, when illuminated, provides a visual indication to the health care coordinator of the health care personnel type at each location.

5. The health care communication system claimed in claim 4, wherein:

each of said designator switches and its associated visual indicator at each of said locations and its associated illuminatable indicator at said location display panel are in series-wired electrical connection.

6. The health care communication system claimed in claim 4, wherein:

each of said visual indicators at each of said locations and its associated illuminatable indicator at said location display panel are connected in parallel electrical connection with their corresponding designator switch.

7. The health care communication system claimed in claim 1 wherein:

said coordinator/personnel intercommunication-means extends between said central console and each of said locations and includes a transmitting-/receiving speaker at each location and a corresponding transmitting/receiving speaker at the central console.

8. The health care communication system claimed in claim 1 further comprising:

another personnel location display means remotely located from and connected to said central console.

9. The system as set forth in claim 1 wherein:

said coordinator/patient intercommunication-means includes a manual call-button interconnected with a patient telephone which is in communication with said central console.

10. The system as set forth in claim 1 wherein:

said coordinator/patient intercommunication-means includes a manual call-button interconnected with a transmitting and receiving speaker at each patient location which is in communication with said central console.

11. The health care communication system as set forth in claim 1 further comprising:

an automatic telephone dialing means at a residence of an outpatient for automatically establishing telephone communication with said central console at said health care facility.

12. The health-care communication system as set forth in claim 11 further comprising:

activator means at said residence for sensing alarm conditioning and actuating said automatic telephone dialing means in response thereto.

13. The health care communication system as set forth in claim 11 further comprising:

a hand-held remote control unit connected to said automatic telephone dialing means including a first control and a second control;

activation of said first control causing said automatic telephone dialing means to electrically off-hook a telephone; and activation of said second control causing said automatic telephone dialing means to electrically on-hook a telephone.

14. The health care communication system claimed in claim 11 further comprising:

a timer means for electrically on-hooking a telephone a predetermined period of time after the telephone is off-hooked.

* * * * *